Aug. 20, 1957 — R. W. LOTZ — 2,803,178
SHUTTER MECHANISM FOR PHOTOCOMPOSING APPARATUS
Filed Aug. 28, 1953 — 5 Sheets-Sheet 2
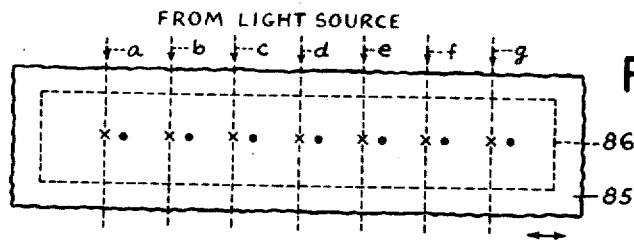
FIG.2b.
FIG.2c.
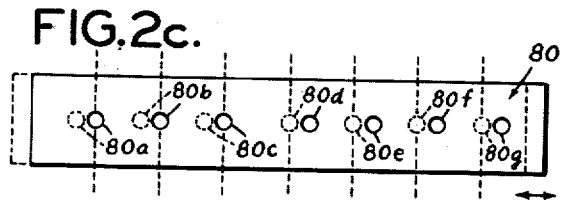
FIG.2a.
FIG.2d.
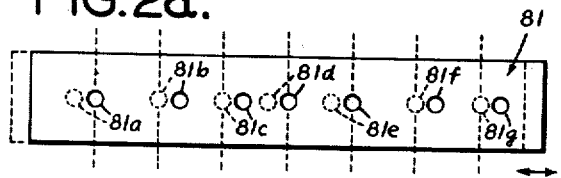
FIG.2e.
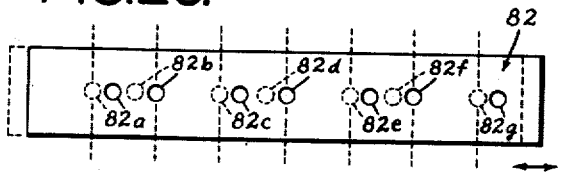
| OPTICAL PATH | CODE | | |
|---|---|---|---|
| — | 0 | 0 | 0 |
| a | 0 | 0 | 1 |
| b | 0 | 1 | 0 |
| c | 0 | 1 | 1 |
| d | 1 | 0 | 0 |
| e | 1 | 0 | 1 |
| f | 1 | 1 | 0 |
| g | 1 | 1 | 1 |
| | SHUTTER 80 | SHUTTER 81 | SHUTTER 82 |
FIG.2f.
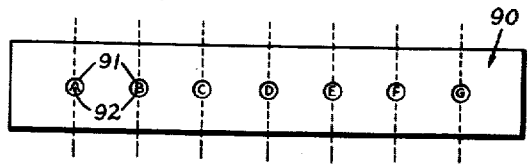
FIG.2g.
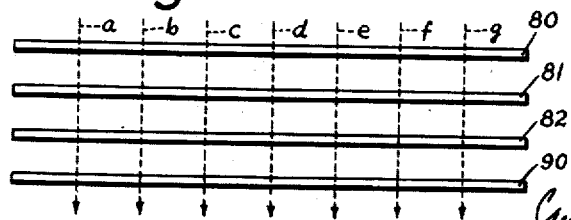
INVENTOR.
ROBERT W. LOTZ
BY
Campbell, Brumbaugh, Free & Graves
HIS ATTORNEYS.

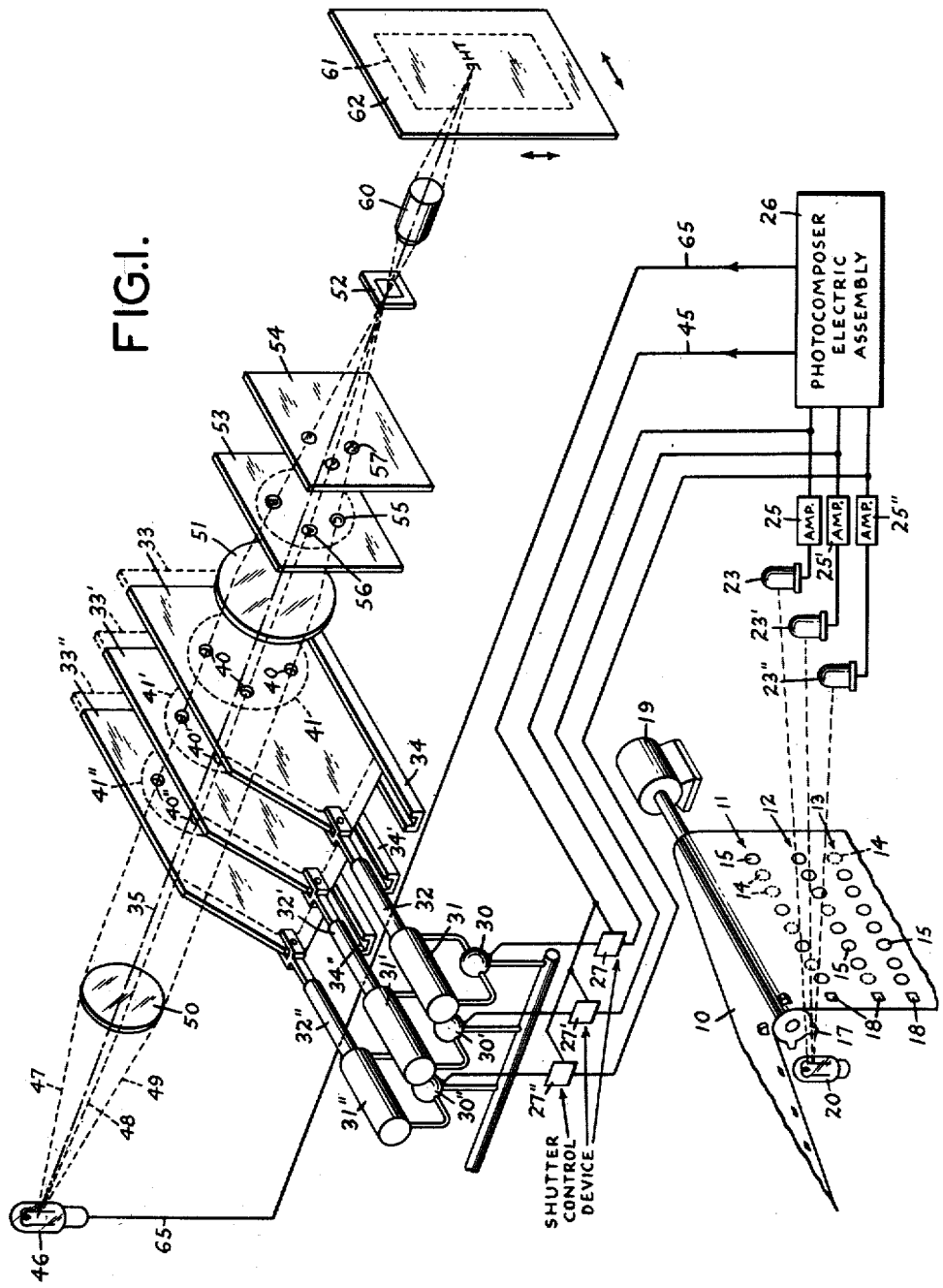

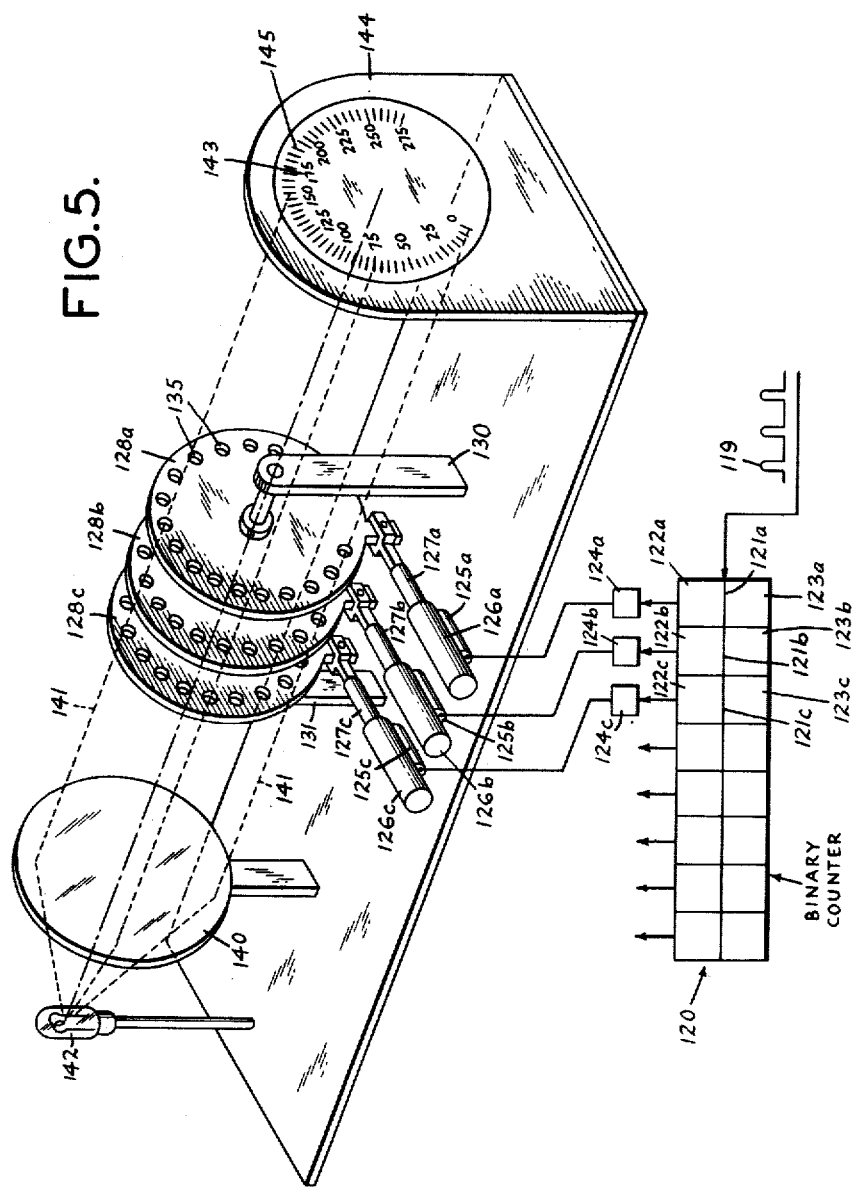

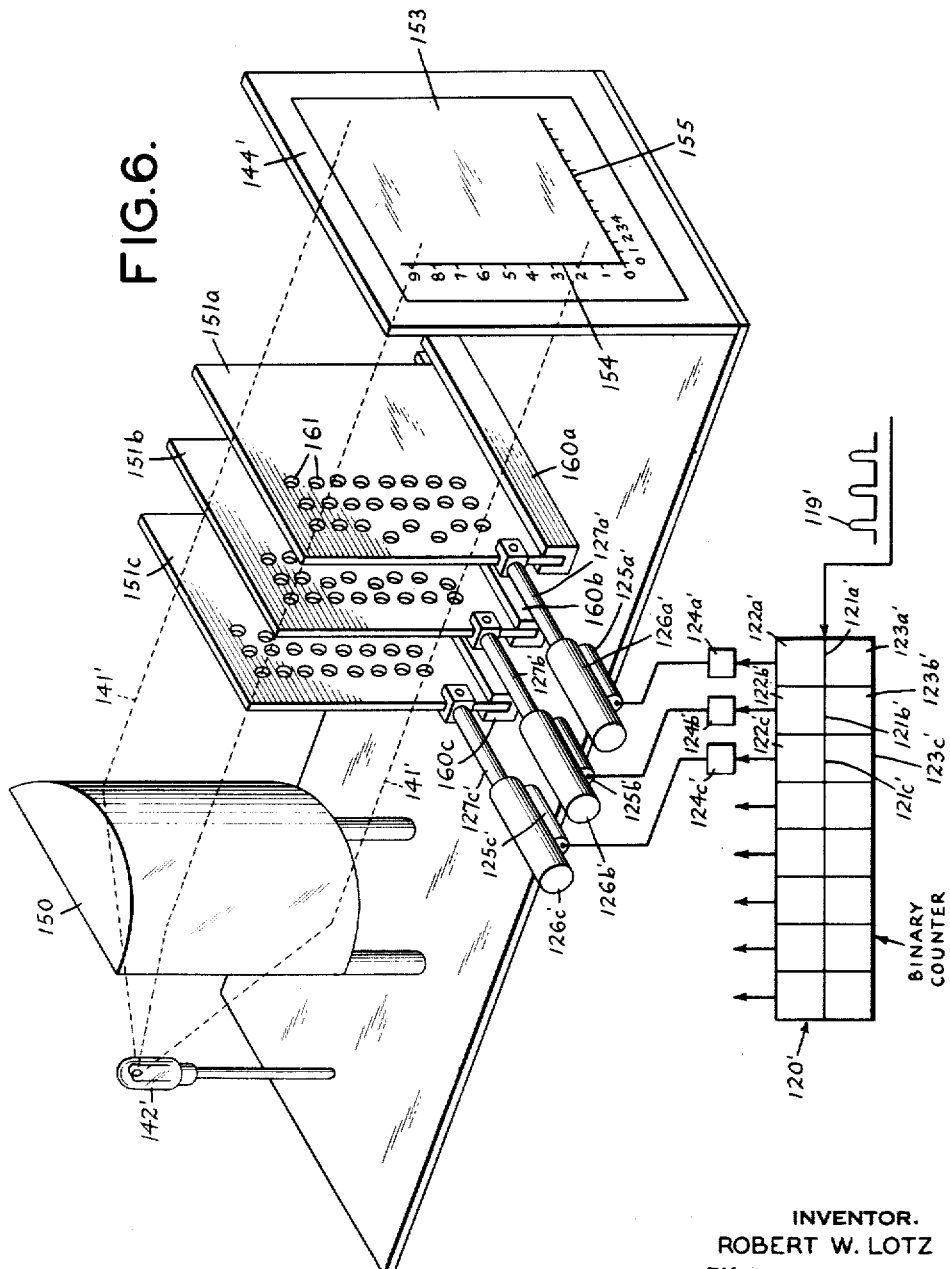

United States Patent Office 2,803,178
Patented Aug. 20, 1957

2,803,178

**SHUTTER MECHANISM FOR PHOTO-
COMPOSING APPARATUS**

Robert W. Lotz, Darien, Conn., assignor to Time, Incorporated, New York, N. Y., a corporation of New York Application August 28, 1953, Serial No. 377,037

7 Claims. (Cl. 95—4.5)

The present invention relates generally to shutter mechanism for selectively permitting light passage through only one or ones of a plurality of optical paths. More particularly, the present invention relates to a mechanism of the above noted character wherein a plurality of shutters are respectively movable to at least first and second positions, and each combination of first and second positions among the plurality of shutters selectively permits light passage through a different one or ones of a plurality of optical paths.

In a copending application of Battle H. Klyce, et al., Serial No. 343,116, filed March 18, 1953, and entitled "Photocomposing Mechanism," there is disclosed a photocomposer wherein a set of characters to be printed are disposed in an optical font plate as opaque figures on transparent print spaces in the plate. The print spaces are arranged on the font plate in a grid formed from an equal number of rows and columns, and the font plate has associated therewith one set of shutters registering with the rows and another set of shutters registering with the columns. In both shutter sets the various shutters have apertures matching the print spaces of the registering row or column. These apertures, however, when the shutter is in normally retracted position, are offset from the print spaces, with the result that the body of the shutter covers the print spaces to block light passage therethrough.

Selection of a print space is accomplished by simultaneously actuating to extended positions one row shutter and one column shutter so that the apertures thereof conjointly uncover only the selected print space. Light from a suitable source, accordingly, passes through and only through the selected print space to project the image of the character thereon beyond the font plate.

While the selective shutter mechanism described above is satisfactory for its intended purpose, inherently the device is subject to certain limitations as to versatility and economy. For example, the required number of shutters is roughly twice the amount, the product of which yields the number of characters desired for the font plate. Thus, if the font plate has 225 characters, 15 row and 15 column shutters are needed, making 30 in all. Further, for effective operation the font plate is essentially limited in form to an approximately square configuration. Third, where font plate characters are selected in accordance with binary code representations thereof on perforated tape or the like, loss is suffered as to some particular binary code combinations which could possibly represent characters, since these particular combinations, although productive of a row or a column shutter extension, are not productive, as required, of both a row and a column shutter extension. Finally, since different binary code groups of signals must respectively be electrically converted into single energizing signals which in turn must be supplied from different outputs to control the different shutters, complex circuits are required.

It is accordingly an object of the invention to provide an optical path selecting shutter mechanism overcoming the above noted limitations.

Another object of the invention is to provide an optical path selecting shutter mechanism for a plurality of optical paths in which the number of required separate shutters is minimized with respect to the number of optical paths among which selection may be made.

Yet another object of the invention is to provide a shutter mechanism of the above noted character in which the plurality of optical paths among which selection is made may be distributed in a wide variety of geometric dispositions.

A further object of the invention is to provide a shutter mechanism of the above noted character wherein shutter control devices may be directly actuated by groups of signals in binary code form, different binary code groups representing different optical paths to be selected.

A still further object of the invention is to provide shutter mechanism of the above noted character which maximizes the number of binary code groups which are utilizable to actuate the shutter mechanism.

These and other objects and advantages of the invention will be more clearly understood when reference is made to the following detailed description of representative embodiments of the invention, taken in conjunction with the accompanying drawings in which:

Figure 1 is an isometric view of a selective shutter system for a photocomposer system;

Figures 2a–2g, inclusive, are explanatory diagrams of the aperture arrangement in the selective shutter system, Figure 2a showing a correspondence table between binary code groups and the optical paths selected by the code groups, Figure 2b showing a master template for laying out shutters, Figures 2c–2e showing shutters laid out from the template, Figure 2f showing a character bearing font plate for the shutters and Figure 2g showing the shutters assembled in cooperable relation;

Figure 5 is an isometric view of a selective shutter mechanism adapted to act as a binary to analog converter; and Figure 6 is a modification of the converter in Figure 5.

Figure 3:
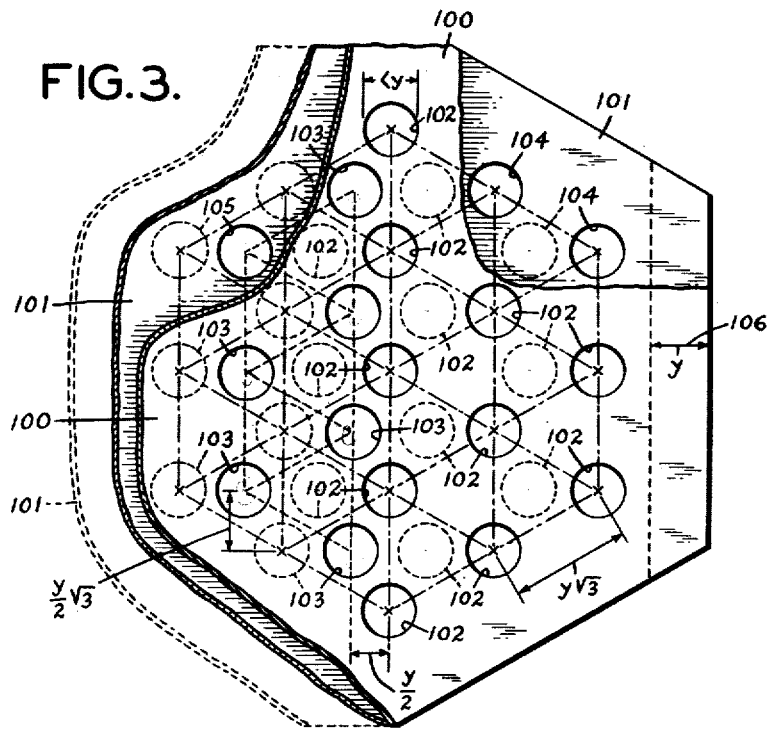
Figure 3 is a diagram of the aperture arrangement for the photocomposer shutters of Figure 1.

Referring now to Fig. 1 the number 10 refers to an information carrying member which may be, for example, a paper tape. The tape 10 has information impressed thereon in the form of 8-element binary code groups of which three code groups, 11, 12 and 13, are shown. The various groups upon tape 10 by their different codings designate different operations to be performed by a photocomposer as, for example, the printing of characters upon a medium, the creation of spaces between printed words, and the production, when appropriate, of a new line of printing upon the medium.

As is well known, in binary code each element in a code group may have one of two possible values, these two values being represented upon tape 10 by, respectively, the absence of a perforation (equivalent to the binary digit "0") and the presence of a perforation (equivalent to the binary digit "1"). Non-perforated and perforated elements are respectively shown by the dotted line circles 14 and the solid line circles 15. Moreover, the various elements in a code group occupy different digit positions, each of which as between the code groups are mutually aligned along the tape. For example, the left hand elements of all the code groups are in alignment in what may be termed the first digit position.

The tape 10 is moved by a conventional sprocket 17 the projections of which enter sprocket holes 18 in the tape. Sprocket 17 is given a step by step motion by a drive mechanism 19 which may, for example, be of the type described in the referred to copending application.

The step by step motion imparted to tape 10 causes each code group thereon to be positioned in turn in a scanning region, the code group when so positioned initiating a selected photocomposing operation. Upon completion of each operation so selected, the tape 10 is advanced by means of the drive mechanism 19 to bring the next code group into scanning position. In Fig. 1 the code group 12 is shown as being in scanning position.

Each code group when in scanning position is detected by sensing means as, for example, a light source 20 disposed on one side of tape 10 and a plurality of photocells disposed upon the other side of tape 10, there being one photocell for each digit position in a code group. While, in practice, eight photocells are employed with 8-element code groups, as a matter of convenience only three photocells 23, 23' and 23" are shown.

The system of Figure 1 includes a number of sub-assemblies comprised of substantially identical parts which are coordinated together in a similar manner. For convenience, therefore, analogous parts in different sub-assemblies are designated by corresponding unprimed numbers, primed numbers and double primed numbers. It will be understood that, unless the context otherwies requires, the description of the parts of one-sub-assembly applies as properly to the correspondingly numbered parts of the other sub-assembles.

The photocell 23 is shown in Fig. 1 as scanning the first digit position elements for code groups. For each such element when scanned by photocell 23, it is apparent that the presence of a perforation 15 (representing the binary digit "1") permits light to pass from source 20 through the perforation to excite the photocell 23 to produce an output signal therefor. Conversely, where there is a non-perforation 14 (representing the binary digit "0") light cannot pass from source 20 to photocell 23, with the result that photocell 23 remains non-excited and produces no output signal.

The output signal of photocell 23 is amplified by passage through an amplifier section 25. From the output of section 25 the amplified signal is fed to a photo-composer electrical assembly 26 to produce therein operations as described in the referred to copending application. The output section 25 also supplies an amplified signal to a shutter control device 27 which may be of the type described in the preferred to copending application.

The shutter control device 27 is electrically connected to a two-way electro-magnetic valve 30 which controls the admission of air from a suitable source (not shown) to a linearly acting pneumatic motor 31. Motor 31 is mechanically coupled by means of a connecting rod 32 to a blade shutter 33 which is both supported and constrained in movement by a first guideway 34, adapted ot receive in sliding relation the lower edge of the shutter, and a second similar guideway (not shown) adapted to receiev in sliding relation the upper edge of the shutter. Normally shutter 33 is maintained in its operating guideways in a retracted position indicated by the solid outline for the shutter. Under the urging of motor 31, however, the shutter 33 may be reciprocated back and forth between its retracted position and an extended position therefor indicated by the dotted outline for the shutter.

As shown in Fig. 1, the plurality of shutters making up the selective shutter mechanism are sequentially disposed along a reference line which may, for example, be the center line 35 of an optical system to be hereafter described. Within the shutter array formed from the plurality of shutters, each shutter extends across the mentioned reference line. Preferably, the various shutters lie in parallel planes, the shutters being arranged in side opposing relation, viz., one or both sides of any one shutter is vis-a-vis with one side of an adjacent shutter in the array. For all the shutters the retracted and extended positions thereof are relatively fixed with respect to the reference line 35. Preferably, the retracted and extended positions for all the shutters are separated by equal and parallel displacements.

The shutter 33 has formed in the body thereof a large number of apertures 40 communicating between one shutter face to the other. For convenience, only a few apertures 40 are shown. In shutter 33 the apertures 40 are distributed in location over the shutter body, the location distribution of the apertures defining an aperture pattern which has for its bounding outline a circular shape as shown by the dotted line 41. In the selective shutter mechanism the other shutters thereof also have formed therein plurality of apertures with location distributions of circular shape. Each shutter in the the array thereof has a different location distribution of apertures from that of any other shutter. The mutual relation between the location distributions of apertures for the various shutters will be more fully explained hereafter.

In operation, when photocell 23 scans a non-perforation (or binary digit "0"), no output signal, as stated, will be produced by the photocell and the shutter 33 remains in its retracted position. When, however, photocell 23 scans on tape 10 a perforation (or binary digit "1"), photocell 23 is excited to produce an output signal. This output signal, through amplifier section 25, shutter control device 27, electromagnetic valve 30, motor 31 and connecting rod 32, causes the shutter 33 to be driven to extended position. The other shutters in the array thereof are operated in a similar manner.

Upon completion of an operation, initiated by the binary code group scanned upon tape 10, the photocomposer electrical assembly 26, by means of lead 45, supplies a reset signal to shutter control device 27. Upon reception of this reset signal the device 27 actuates valve 30 to cause motor 31 to restore shutter 33 if extended to its retracted position, other extended shutters being also retracted at the same time. Concurrently, tape 10 is advanced to bring a new code group into the scanning region. This new code group is scanned to initiate a new operation for the photocomposer, various shutters in the array being again extended as described.

It will be seen that each code group scanned causes certain shutters to be extended while the others remain retracted, different code groups producing different combinations of extended and retracted shutters. These different shutter combinations in turn cause selection of different optical paths in a manner later described.

Considering now the optical system associated with the selective shutter mechanism, from a suitable source of light 46 there are emanated a number of light rays which follow, for example, the optical paths 47, 48 and 49. These optical paths 47, 48, 49 (and thus the light rays following the same) pass through a collimating lens 50 which parallelizes the optical paths. From lens 50 the various optical paths pass through the shutter array previously described, light being permitted, however (as later described), to pass through the apertures of the shuter array only along a selected one or ones of the optical paths. Beyond the shutter array the various optical paths pass through a converging lens 51 which directs the paths to a single focal point within the aperture of a member 52. Between the lens 51 and member 52 there is disposed to lie across all of the optical paths a font plate 53 and a focusing lens support plate 54.

The font plate carries thereon a number of transparent print spaces 55 respectively centered about the various optical paths, the print spaces 55 permitting light in the mentioned optical paths to travel through the font plate. Within each print space 55 is disposed an opaque character 56 such as a letter, number, punctuation mark or the like. Light rays in optical paths selected for light transmission by the shutter array will, accordingly, pass through corresponding print spaces to project the image of the character 56 within the print space beyond the font plate 53 and toward the member 52.

The support plate 54 carries a plurality of convex lenses 57 respectively aligned with the axes of the corresponding optical paths passing therethrough. Lenses 57 act to focus the images of the characters 56 which are carried by light beams passing through font plate 53.

As is seen, each image of a character 56 is projected by converging light rays to a common point within the aperture of member 52, the image carrying light rays diverging beyond the member. This divergent effect is corrected by a reconverging lens system 60 so that images appearing in turn at member 52 are focused at a fixed location in space upon the surface of a photosensitive printing medium 61 (shown in dotted outline). The medium 61 is mounted upon one side of a frame 62 (described in the referred to copending application) which may be moved horizontally from right to left, as seen from light source 46, to permit exposure of a line of printing upon the medium. As the frame 62 so moves, by the cycle of operations described in the referred to copending application, the shutter array responsive to the code groups on tape 10 selects characters 56 on font plate 53 to be printed. When the carrier 62 in its movement is positioned to appropriately receive a new character on a line being exposed the light source 46 is flashed on by a signal supplied over lead 65 from the photocomposer electrical assembly 26, the burst of light energy from source 46 causing exposure on medium 61 of the image of the character 56 selected.

As described in the referred to copending application, certain of the code groups on tape 10 may designate photocomposer operations other than character printing operations. For example, when one line of printing has been completed the frame 62, responsive to the scanning of a code group, may be given a horizontal fly-back motion and may concurrently be stepped vertically to permit a new line of printing to be exposed on medium 61. Other code groups upon tape 10 may cause other "make-up" operations such as changing to a new page or column, etc. Still other code groups may cause the creation of word spaces between words printed on a line of the medium.

Where a code group requires other than the printing of a character, the operation designated by the code group is performed responsive to signals received by the assembly 26 from the amplifier sections (e. g. amplifier section 25) while concurrently the shutter control devices (e. g. device 27) are uncoupled from the amplifier sections by means (not shown) which may be of the type described in the referred to copending application. Thus, during a non-printing operation the entire shutter array is disabled with the result that wear from useless driving of the shutters is avoided.

Referring now to Figs. 2a–2g, inclusive, the figures furnish an explanation of how the apertures in each shutter may be laid out in location distribution so that in the shutter array each different combination of retracted and extended shutter positions selects for light transmission one and only one optical path through the apertures of the array.

As stated, the collimating lens 50 (Fig. 1) produces a number of parallel optical paths. Assume, for simplicity of understanding, that in the plurality of optical paths so produced there are a number of paths a–g, inclusive (Figs. 2b–2g) lying in a common plane, and traversing an array of shutters 80 (Fig. 2c), 81 (Fig. 2d), and 82 (Fig. 2e). These shutters are normally arranged in side opposing relation (Fig. 2g) but for explanation are shown (Figs. 2c–2e) as each rotated 90° so that all the shutters lie in the common plane of the optical paths a–g. Each of the shutters is normally disposed in retracted position as indicated by the solid outline therefor, but may be moved to extended position as indicated by the dotted outline therefore. The group of shutters 80, 81, 82 may be considered to represent, respectively, simplified versions of (Fig. 1) shutters 27", 27' and 27.

Fig. 2b represents diagrammatically a master template 85 for laying out the aperture locations upon the shutters 80, 81, 82. The template 85, which may be of translucent paper or the like, has marked thereon an outline 86 of the shutter dimensions so that the template may be repetitively superposed in proper relation upon the shutters. Moreover, template 85 has thereon a number of (X) marks and a number of (.) marks. With respect to these designations, if template 85 is superposed upon any given shutter the (X) marks indicate locations such that, if apertures are formed in the given shutter in centered relation with the (X) marks, these apertures for a retracted position of the given shutter will be aligned in centered relation with the various optical paths therethrough. Thus, when a given shutter is in retracted position an aperture located by an (X) mark will transmit light reaching the shutter by the optical path associated with the aperture.

Conversely, with superposition of the template on the shutter as described, the (.) marks indicate locations such that, if apertures are formed in the given shutter in centered relation with the (.) marks, these apertures for an extended position of the shutter will be aligned with the optical paths through the shutter. Thus when a given shutter is in extended position an aperture located by a (.) mark will transmit light reaching the shutter by the optical path associated with the aperture.

It is thus seen that for each pairing of a given optical path with a given shutter, an aperture associated with the given path is formed in the body of the given shutter, this aperture having, however, two possible locations. In one "retract-pass" location the aperture passes light along the given optical path when the given shutter is in retracted position, and in the other "extend-pass" location the aperture passes light along the given optical path when the given shutter is in extended position. In Figs. 2c–2e for both the retract-pass and the extend-pass apertures, the locations thereof with respect to the optical paths are shown by solid line circles for retracted shutter positions and dotted line circles for extended shutter positions. Of course, both type apertures maintain fixed relative locations with respect to the shutter body in which they are formed.

Referring now to the table shown in Figure 2a, the right-hand column thereof lists a set of binary code groups arranged from top to bottom in systematic order. Each code group (for example, the code group "001") is composed of three binary digits occupying respective digit positions in the code group. Beneath the set of code groups, the table indicates which of the shutters 80, 81, 82 is actuated responsive to the presence of a digit in a given digit position in a given code group. It will be recollected from the description of Fig. 1 that in the presence of an "0" digit the shutters will remain in retracted position, but that in the presence of a "1" digit the shutters will be moved to extended positions.

The left-hand column of the table of Fig. 2a lists the paths a–g, inclusive, which are to be rendered respectively light transmitting in the presence of the correspondingly listed code group. For example, the table shows that path "a" is to be rendered light transmitting in the presence of the code group "001." For reasons later appreciated the code group "000" is not utilized to actuate any light path.

With the information at hand from Fig. 2a, the laying out of apertures on the shutters becomes a relatively simple matter. Starting with the code group "001," the template 85 is first superposed on the shutter 80. By reference to the table, it is known that, (1), for group "001," shutter 80 is in retracted position, and, (2), when shutter 80 is in retracted position, in order to make the "a" optical path light transmitting, light at least must pass through the shutter 80. These mentioned conditions are fulfilled by marking in conformity with the appropriate (X) mark on template 85 the center of an aperture 80a in retract-pass location on shutter 80 (Fig. 2c). With the position for the aperture 80a so established, the aperture may be later formed in the shutter by drilling, or the like.

Next, template 85 is superposed on shutter 81. Reference to the table indicates that the same conditions obtain for shutter 81 as for shutter 80. Accordingly, there is marked on shutter 81 the position of aperture 81*a* in retract-pass location (Fig. 2*d*), which aperture is later formed in the shutter.

Lastly, template 85 is superposed on shutter 82. Reference ot the table indicates that, (1), for group "001," shutter 82 is in extended position, and, (2), when shutter 82 is so extended, in order to make the "*a*" path light transmitting, light at least must pass through shutter 82. The mentioned conditions are fulfilled by marking in conformity with the appropriate (.) mark on template 85 the center of an aperture 82*a* in extend-pass location (Fig. 2*e*) on shutter 82, the aperture being later formed in the shutter.

Tracing the course of the optical path "*a*" as a check, it is seen that with apertures 80*a*, 81*a* and 82*a* located in their respective shutters, as described, with shutters 80 and 81 in retracted position, and with shutter 82 in extended position, light will pass freely along the "*a*" path through the mentioned group of apertures. Thus the previously described mode for laying out the shutters from the template 85 is verified.

The various apertures corresponding with the optical paths *b–g*, inclusive, may be laid out and formed in the various shutters in a manner similar to that described with regard to optical path "*a*."

In practice the above-described mode for laying out the apertures can be facilitated by laying out all at once the apertures in one specified shutter. For example, by reference to the table (Fig. 2*a*), it is seen, reading from top ot bottom the column for the left-hand digits of the code groups, that in shutter 80 apertures 80*a*–80*c* should be in retract-pass location and apertures 80*d*–80*g* should be in extend-pass location. All of the apertures on shutter 80 may be, accordingly, laid out at one time.

As another simple mode of aperture layout, the shutters can be clamped together in a number of successive assemblies, the shutters in each assembly being relatively disposed to correspond with the extension-retraction combination called for by a particular code group in the table (Fig. 2*a*). After clamping the shutters a single hole is bored through each assembly at the place where it is wished to have a light transmitting optical path exist under operating conditions in the extension-retraction combination represented by the assembly. The hole so bored in one shutter assembly forms one aperture in each shutter, different assemblies adding different apertures to each shutter. Thus the shutters when together in operable array will act conjointly to select the optical paths respectively chosen for the combinations.

From the foregoing discussion it is apparent that various combinations of shutter positions form various light transmitting paths through the shutter array, and that at least one light transmitting path exists for each different shutter combination. Considering now the reason why the array is fully selective, permitting light to pass along one and only one optical path, reference to the table of Fig. 2*a* indicates that from one binary code group to another there is a change in the code groups which at the least (the situation where nonselectivity might be most expected to occur) is represented by a change in the binary digit in a given code group digit position. For example, in the code groups "010" and "011," selecting respectively the paths "*b*" and "*c*," there is a change in the right-hand digit position from "0" to "1." For the situation considered this means that on at least one shutter having two apertures corresponding with the two optical paths selected by the two considered code groups, one aperture must be in retract-pass location and the other in extend-pass location. Thus, in the example given, on shutter 82, aperture 82*b* is in retract-pass location while shutter 82*c* is in extend-pass location.

By virtue of the different type locations of apertures 82*b* and 82*c*, when shutter 82 is retracted to, of itself, select path "*b*," the shutter 82 perforce blocks by its body the path "*c*," since no "retract-pass" aperture 82*c* is present. Conversely, when shutter 82 is extended to of itself select path "*c*," the shutter 82 perforce blocks path "*b*" by its body, since there is present no "extend-pass" aperture 82*b*. Accordingly, as between paths "*b*" and "*c*," one and only one path can be selected at one time (the other path being blocked by the body of shutter 82). This specific situation given as an example obtains generally in the shutter array, the apertures thereof having such location distributions on their shutters that the various apertures cooperate to select one and only one light transmitting optical path for each combination of shutters in retracted and extended positions.

In the matter of selection it is to be noted that the various groups (Fig. 2) when taken sequentially from top to bottom in systematic order cause sequential selections of the light paths *a–g*, inclusive, in systematic order, the path which is light transmitting moving progressively in the left to right direction from point to point in a geometric disposition, which is of straight line nature.

Between the array of shutters 80, 81, 82 and a light-receiving function-performing device (not shown in Figs. 2*a*–2*g*) as, for example, the medium 61 (Fig. 1), there may be interposed a font plate 90 bearing a plurality of transparent print spaces 91 respectively aligned with the optical paths *a–g*, inclusive. These print spaces 91 respectively carry at the centers thereof a plurality of opaque characters 92 as, for example, the letters A, B, C, D, E, F, G, arranged systematically in the order stated, from left to right. Insofar as the light-receiving function-performing device is concerned, it will be seen that the selection of a particular optical path by the shutter array causes the particular image of the character associated with with the optical path to be received by the function-performing device.

While the shutters of Figs. 2*c*–2*e* have been used in the foregoing discussion by way of explanation, it will be appreciated that if shutters 80, 81 and 82 are assembled in the manner shown by Fig. 2*g*, a fully workable selective shutter mechanism will result. At the same time, it will be appreciated that other selective shutter mechanisms, while still exemplifying the invention disclosed herein, may variously differ in structure and aperture layout from the mechanism shown in Figs. 2*c*–2*e*. For example, it is obvious that the operability of a shutter array is independent of the order in which the shutters lie in the array. Moreover, the aperture layout may be such that each combination of shutters in retracted or extended positions selects for light transmission not only one optical path but a plurality of optical paths, light passage through non-selected paths still being prevented in the manner hitherto described. Optical path selection may be obtained by selectively disposing the shutters at first and second positions through a movement which is not rectilinear. Thus (as later described) each of the shutters in an array may travel between first and second positions by a rotary rather than a translatory movement of the shutter.

Obviously (Fig. 2*f*), the characters 92 on the font plate may be mutually transposed to be arranged in any order found convenient. Also, assuming a given set of optical paths, as for example *a–g* inclusive, to be selected in correspondence with a set of binary code groups in systematic order (exemplified by the code group table in Fig. 2*a*), the various optical paths in the given set may be geometrically mutually transposed to lie in any order found convenient. For example in Figs. 2*b*–2*f*, the optical paths may progress from left to right in the order *badcfeg*. Moreover, the optical paths need not lie on a straight line, but may define among themselves any geometric disposition whatever. For example, the optical paths may lie along a smooth line, such as a circle, or an irregular line, or may define a geometric figure such as a hexagon, or may define a set of geometric figures. The optical paths themselves need not be parallel.

Regarding the above-mentioned geometric disposition of optical paths, Fig. 3 diagrammatically sets forth a mode by which the apertures in the shutter system of Fig. 1 may be laid out to provide the maximum number of apertures (and optical paths) per unit area on the face of a shutter.

Considered in detail, Fig. 3 represents a view of a portion 100 of an overlying shutter and a portion 101 of an underlying shutter, the two mentioned shutters being, for example, equivalent to any two adjacent shutters in the array thereof shown in Fig. 1. Shutter portions 100 and 101 are considered as being disposed across a number of optical paths, the axes of which are designated by the symbol (X). Shutter portion 100 has formed therein on the right and left-hand sides thereof a number of apertures 102 and 103 which are respectively in "retract-pass" and "extend-pass" locations with respect to the shutter 100. As seen (Fig. 3), the two types of apertures for shutter portion 100 meet at the center of the shutter portion to both occupy this area.

Shutter portion 101 has formed therein a number of "retract-pass" and "extend-pass" apertures 104 and 105 so disposed that for any given optical path the apertures on shutter 101 match in location (relative to the shutter body) the apertures on shutter 100. Thus, if a given optical path has a "retract-pass" aperture associated therewith on shutter 100, the given optical path also has a "retract-pass" aperture associated therewith on shutter 101. It will be understood that while in the shutter portions 100 and 101 the respective apertures thereof are fully matching, other portions of the overlying and underlying shutters would have non-matching aperture pairs in order to obtain optical paths selectively for the array in which the shutters would be incorporated.

Both the shutters 100 and 101 are normally maintained in retracted position, as indicated by the solid outlines therefor. In such position it will be seen (Fig. 3) that the "retract-pass" apertures for both shutters are maintained in registry and in centered relation with the optical path axes through the shutters. Simultaneously, the "extend-pass" apertures for both shutters will be in registry but will be offset from the optical path axes. By displacements as indicated by arrow 106, either shutter independently, or both shutters together, may be moved between their retracted positions and extended positions, the latter positions being indicated by dotted outlines for the shutters. For an extension position of one or both shutters, the disposition of the apertures of the one or two extended shutters is shown by the dotted line circles in Fig. 3.

As a matter of aperture design, if a shutter, such as shutter 100 or 101, in going from a retracted to an extended position moves, rectilinearly, by the distance $y$ (as shown in Fig. 3) it is evident that the apertures on the shutter must have a diameter at the most of slightly less than $y$. Otherwise (for diameters just equal to or greater than $y$), if the underlying shutter is extended to cut off light transmission through the apertures of the still retracted overlying shutter, the underlying shutter will not properly perform this mentioned function, since the underlying apertures may or will overlap in disposition the overlying apertures, permitting light leakage through the two shutters. The same undesirable condition of overlap would or might obtain if shutter 100 rather than shutter 101 is extended. Similarly, overlap will or may occur if two shutters for a given optical path form a non-matching aperture pair (i. e. one aperture is in retract-pass and the other in extend-pass location, and the two shutters simultaneously occupy retracted or extended positions).

It is thus evident that to prevent overlap or any possibility of overlap the apertures must have diameters of less than $y$. On the other hand, consonant with the requirement of avoiding overlap, it is desirable to have the aperture diameters approach as close as possible to the value $y$ in order to enlarge the optical path cross section areas to permit, for example, the use of large size characters for image projection purposes.

As a further consideration it is evident that the various apertures in a shutter must be so arranged that when, for example, underlying shutter 101 is extended to cut off light passing through the apertures of overlying shutter 100, an underlying aperture associated with a given optical path will not overlap with an overlying aperture associated with a different optical path to permit light leakage through both shutters along this different optical path. The same condition obtains if shutter 100 rather than shutter 101 is extended.

In fulfilling the conditions set forth, namely, (1), that the diameter of the apertures should approach as close as possible to the value $y$ while avoiding overlap in optical paths directly associated therewith, and, (2), that the apertures in location distribution must be so arranged that the apertures for one path at no time overlap in disposition the apertures of another path, it has been found that the maximum number of apertures may be disposed in a given area of shutter face by locating the centers of all retract-pass apertures at intersection points in an equilateral triangle mesh (indicated by the dot-dash lines in Fig. 3), the mesh triangles having sides of a length equal to $y\sqrt{3}$. With such arrangement, when one shutter is extended and the other retracted, the retract-pass apertures for the extended shutter assume dispositions in the center of the equilateral triangles formed by the retract-pass apertures in the unextended shutter. Since the aperture diameters are less than $y$, with the retract-pass apertures in the disposition just stated, interspaces will always exist between any retract-pass apertures of the extended shutter and the close retract-pass apertures of the unextended shutter. When such interpsaces are present there can be no overlap, and a light leakage is prevented.

It will be noted, since for a retracted shutter position the retract-pass apertures are centered about the axes of the optical paths, that these optical path axes are also disposed at the intersection points of the equilateral triangle mesh of the retract-pass apertures.

Given an equilateral triangle mesh distribution for the locations of the retract-pass apertures, it will be found in laying out the extend-pass apertures on a shutter, that these latter apertures will necessarily conform to a second equilateral triangle mesh, indicated by dotted lines in Fig. 3. This second equilateral triangle mesh has similar size triangles to those of the first mesh, lies in parallel relation to the first mesh, and is displaced from the same by distances of $y/2$, taken in the direction of shutter displacement between retracted and extended positions and $y/2\sqrt{3}$ in the direction normal to shutter displacement.

As stated, retract-pass apertures and extend-pass apertures are shown admixed in the center areas of shutter portions 100 and 101. Considering these mentioned center areas, it will be seen that, in any area for a shutter, retract-pass apertures and extend-pass apertures may be freely interspersed with each other while conforming with locations on their respective meshes, since, as seen in Fig. 3, regardless of the interspersal of the two aperture types, interspaces (preventing optical path overlap) will exist under any conditions between retract-pass and extend-pass apertures in the same or different shutters.

From the disposition of the apertures in the center areas of shutters 100 and 101 it will be seen that the two aforementioned triangular meshes have a further geometric interrelation in that they form a mesh of hexagons, ones of the vertices of the hexagons being represented by either centers of retract-pass apertures or centers of extend-pass apertures.

It will be appreciated that the equilateral triangle mesh distribution of the apertures lends itself readily to a hexagonal outline. This hexagonal outline in turn by omitting apertures within the hexagon near the vertices thereof and adding apertures outside the hexagon intermediate the vertices thereof can be rounded off to an approximately circular shape, as, for example, the circular outline 41 shown in Fig. 1. This circular outline for the aperture pattern is advantageous, since it both (1), provides arrangement of individual apertures in equilateral triangle mesh relation permitting, as stated, a maximum number of apertures in a unit area of shutter face and, (2) yields the figure most practical for the ordinary optical system which utilizes lenses and similar elements having a circular form.

It will be also appreciated that, while only a limited number of apertures are shown in Fig. 3, the number of apertures in equilateral triangle mesh relation and yielding a circular outline for the aperture pattern may be increased greatly by expanding the two equilateral triangle meshes, and by arranging the apertures in the meshes to form the desired pattern with the circular outline. The maximum number of apertures preferably employable is, in fact, determined by the nature of the binary code groups utilized to control the selective shutter system, this maximum number being equal to $2^n-1$, where $n$ equals the number of digit positions in the binary code groups. For example, in Fig. 1, where 8-digit-position code groups are employed, at the maximum $2^8-1$, or 255 apertures in a shutter (or corresponding optical paths through the shutter) are, preferably, utilized.

The optical path corresponding to the binary code group with "0" for all digits is not ordinarily used, since such path would transmit light when all the shutters are rested in retract position. Note that for the code group with "1" for all digits, the apertures thereof, being all in alignment, also transmit light for a rest position for all shutters. The path for the light transmitted, however, is offset from the true optical path to be selected by this latter mentioned code group. Hence any light transmitted in this offset path will be blocked by the body of the font plate.

Figure 4:
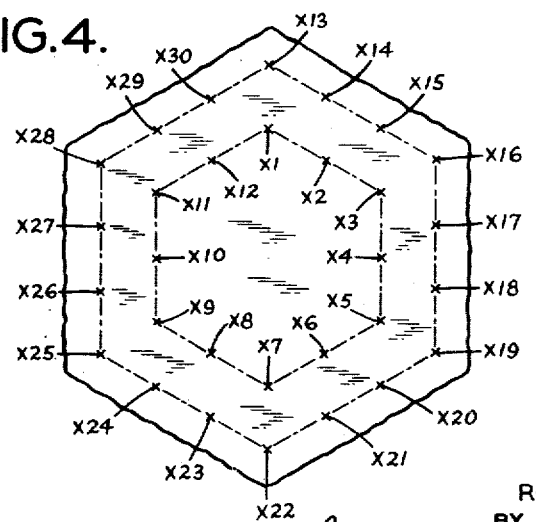
Figure 4 is a diagram of a systematic order of arrangement of the optical paths in Figure 1.

It will be understood that the foregoing discussion outlines a scheme of aperture location distribution which is applicable to all shutters in an array thereof such as, for example, the shutter array of Fig. 1. Within each shutter the various apertures thereof, while conforming in location to the triangular meshes described, may be distributed as explained with respect to Figs. 2a–2g, so that the different combinations of retracted and extended shutter positions select different optical paths. For a sequence of binary code groups in systematic order, as in Figure 2a, the different aperture patterns on the various shutters may be such that optical paths are selected which in geometric disposition and sequence of selection are arranged in systematic order. Fig. 4 diagrammatically shows an exemplary systematic arrangement of optical paths X1, X2, X3, etc., the paths forming in geometric disposition a set of concentric hexagons, and the paths being selected in the numbered order of the paths by a regular sequence of binary code groups. It will be understood that while only two concentric hexagons are shown in Fig. 4, in practice, additional concentric hexagons may be added to furnish a larger number of optical paths, as, for example, the 255 paths employable with the photocomposer of Fig. 1. It will be further understood that the outside hexagon may be rounded off, as stated, to afford a circular outline for aperture pattern as a whole.

Referring now to Fig. 5, the figure shows an apparatus in which a selective shutter mechanism is utilized as a binary to analog conversion device. The apparatus of Fig. 5 consists of a number of separate sub-assemblies the parts of which, however, are analogous and perform similar functions. Accordingly, for convenience, equivalent parts in respective sub-assemblies are designated by the same number but by different letter suffixes for the numbers. It will be understood that unless the context otherwise requires, a description herein of the parts of one sub-assembly applies as properly to the analogous parts of the other sub-assemblies.

Considering Fig. 5 in more detail, a series of pulses 119 from a pulse source (not shown) is supplied to the input of a binary counter 120 which may be, for example, an 8-stage counter. As to one of these stages, 121a, of counter 120, the stage comprises (as is well known in the art) a multi-vibrator circuit having a separate front section 122a and back section 123a. The front sections of all the stages in binary counter 120 may be considered to form a front array. As is known to the art, binary counter 120 converts the pulses supplied to the input thereof into the binary code equivalent of the total pulse count, this binary code being represented by the combination formed by conducting front sections and non-conducting front sections in the front array of the counter. Binary counter 120 may be of the well known reset type in which the counter registers counts from 1 up to a maximum count of say 250. After reaching the predetermined maximum count the counter clears and resets itself back to a condition equivalent to a count of zero.

In Fig. 5, the various front sections are respectively associated with a plurality of shutters and control sub-assemblies therefor, of which, for convenience, only three shutters and sub-assemblies are shown in Fig. 5, and with regard to which a detailed description will be given only of one shutter and the sub-assembly associated therewith. Specifically, the front section 122a is electrically coupled with a shutter control device 124a which in turn is electrically coupled to an electromagnetic valve 125a. Valve 125a, in a well known manner, controls the action of a linear pneumatic motor 126a. Motor 126a, under the governance of valve 125a is adapted to reciprocate a connecting rod 127a between retracted and extended positions with respect to the motor.

The connecting rod 127a at its outer end is mechanically coupled in a conventional manner to a circular disk type shutter 128a centrally supported in rotatable relation by a pin 129 extending between a pair of upright arms 130 and 131. When connecting rod 127a is driven by motor 126a, to its retracted and extended positions, shutter 128a is correspondingly driven by the connecting rod to first and second angular positions.

The shutter 128a has formed therein close to its periphery a plurality of apertures spaced apart on a circle concentric with pin 129. No apertures are formed in shutter 128a upon the lower arc of the concentric circle where a clear optical path through the shutter would be blocked by the body of arm 130. As is seen, the shutter 128a is incorporated into a shutter array which includes a number of similar type shutters (for example, shutters 128b and 128c) which are similarly apertured and which are also rotatably supported by the pin 129. To give the array the feature of optical path selectivity, each of the shutters in the array has a different location distribution of apertures thereon, the mutual relations between the different distributions being later described.

The shutter array just described represents a portion of an optical system in which a collimating lens 140 parallelizes a number of optical paths 141 originating from a light source 142. The optical path 141 of interest pass through the shutters in the regions of the apertures 135 thereon and continue beyond the shutter array to terminate upon the back face of a translucent indicator screen 143 which is supported in a mounting 144. The indicator screen 143 has formed on its front face, in alignment with the incomplete circles defined by the apertures on the shutters, a graduated and numbered scale 145. Scale 145 extends substantially around the periphery of the indicator screen 143, the arcuate portion of the periphery not occupied by the scale representing optical regions where upright arms 130 and 131 are interposed between screen 143 and source 142.

In operation, when front section 122a is in a non-conducting state, shutter control device 124a is unactuated and, under the control of valve 125a, the motor 126a maintains through rod 127a the shutter 128a in the mentioned first angular position. When, however, front section 122a is rendered conducting, shutter control device 124a is actuated to cause, through valve 125a, motor 126a to drive rod 127a to an extended position. The shutter 128a, by the movement of rod 127a, is accordingly driven to its mentioned second angular position. When, thereafter, front section 122a is again rendered non-conducting, front section 122a causes, through the elements which it controls, the return of shutter 128a to its first angular position.

If the non-conducting state of front section 122a is assumed to represent the binary digit "0," and its conducting state is considered to represent the binary digit "1," as pulses are supplied in turn to the input of counter 120, the behavior of front section 122a follows (reading from top to bottom) the right-hand digit position column for the binary code group table in Figure 2a. Similarly, the behavior of front sections 122b and 122c follows in the same way, respectively, the middle digit position and left-hand digit position columns in the binary code group table.

In this view it is apparent that if the apertures of all the shutters in the array are laid out in location distribution progressively around the extent of their concentric circles in the systematic manner explained in conjunction with Figs. 2a–2g, as each new binary code group appears upon the front array of binary counter 120, the shutter array will permit a new optical path to transmit light through the shutters, the path selected for light transmission progressively moving counterclockwise (as seen from light source 142) around the concentric circle of the shutter apertures. Light transmitted through any one optical path will fall upon the back face of screen 143 causing a spot of light to appear on the front face thereof. This spot of light moves, for each pulse received by counter 120, one unit clockwise (as seen on the front face of screen 143) along the graduated scale 145. Accordingly, by reading on scale 145 the number of the scale mark presently illuminated by the light spot, the total number of pulses received by binary counter 120 may be determined. Alternatively, the distance on scale 145 between the scale mark illuminated by the light spot and the beginning of the scale may be used to represent the analog value of the binary code group appearing at that time upon the front array of binary counter 120.

Fig. 6 discloses a binary to analog converter in which the parts designated by primed numbers are the same as the correspondingly numbered parts of Fig. 5 and, hence, need not be described. In Fig. 6, however, the cylindrical lens 150, rectangular shutters 151a, 151b, 151c, rectangular screen 153 and scales 154, 155, respectively, replace the lens 140, circular disk shutters 128a, 128b, 128c, circular screen 143 and scale 145 of Fig. 5. It will be understood that unless noted hereafter the foregoing description of the binary to analog converter of Fig. 5 applies as properly to the converter of Fig. 6.

As in the case of Fig. 5, the shutters in Fig. 6, which form the shutter array, are in most aspects similar, with the result that unless otherwise noted, the description of shutters 151a applies as properly to the other shutters in the array. Shutter 151a is supported and contained by a lower guideway 160a receiving the lower shutter edge and an upper guideway (not shown) receiving the upper shutter edge. The shutter 151a resulting from its mounting in the guideways and responsive to the driving of rod 127'a is adapted to move rectilinearly between retracted and extended positions.

The shutter 151a has formed therein a plurality of apertures 161 arranged in a grid of columns wherein each column contains say 10 apertures and wherein the number of columns equals the counting span of binary counter 120' divided by the number of apertures in each column. Thus in the present example, if binary counter 120' registers counts from 1 to 250 and there are 10 apertures in each column, the number of columns equals 250/10 or 25. For convenience, in Fig. 6 only a few columns are shown.

In Fig. 6 the aperture location distributions are laid out among the various shutters (in accordance with the systematic method discussed anent Figs. 2a–2g, inclusive) so that as the count of binary counter 120 progressively increases from zero, the optical path selected as light transmitting moves progressively from the bottom to the top of the left hand column, then from the bottom to the top of the column next to the right, and so on. Accordingly, the light spot appearing on the front face of screen 153 will move in a similar fashion.

The front face of screen 153 exhibits thereupon a vertical scale 154 and a horizontal scale 155. Scale 154 from its intersection with scale 155 at a point designated "0" (zero) is graduated by a set of indicia numbered in order from "1" to "9" and coinciding respectively with the vertical displacements of the various optical paths from point "0" (zero). Similarly, scale 155 from the intersection point "0" (zero) is graduated by a set of indicia numbered in order and coinciding respectively with the horizontal displacements of the various optical paths from point "0" (zero).

In view of the described systematic progression of optical paths selected and of the described scale relations, it will be seen that the binary to analog converter of Fig. 6 indicates the count registered by counter 120" by a light spot presentation on screen 153 in which the vertical position of the light spot as measured by scale 154 represents in decimal terms the ones units of the registered count and in which the horizontal position as measured by scale 155 represents the tens and higher units of the count. For example, if the count registered by counter 120' in decimal terms is "135," this count will be indicated by a light spot appearing on the front of screen at the same height as the indicia numbered "5" on scale 154 and with the same horizontal displacement as the indicia numbered "13" on scale 155.

By representing a registered count in this manner a considerable advantage is afforded since the entire face of screen 153 may be utilized for the exhibition of information. Accordingly, the same size screen can be used with much larger counting spans for counter 120 than would be the case where the information presented is confined to a simple line as in Fig. 5.

The illustrative embodiments described above and in the accompanying drawings are obviously susceptible of modification in form and detail within the spirit of the invention. The invention, therefore, is not to be limited save as defined in the appended claims.

I claim:

1. In a photocomposer the combination comprising, a plurality of shutters parallel to a common plane and disposed seriatim in a direction normal to said plane, all said shutters being movable between reference and operated positions by translatory movements which are parallel to said plane, means defining a plurality of optical paths which pass through and normal to said shutters and plane and which are mutually spaced in said plane to form therein a patterns wherein said paths are distributed seriatim both along and transversely to the line of movement of said shutters, each of said shutters having formed therein a different pattern of optical apertures respectively corresponding to said paths and distributed over the shutter to provide that some of said apertures are aligned with some of said paths when the shutter is in said reference position and the rest of said apertures are displaced from their corresponding light paths when the shutter is in reference position by a displacement equal in amount and direction to the displacement undergone by the shutter in moving from reference to operated position, the rest of said apertures being thereby aligned with the rest of said paths when the shutter is in said operated position, the aperture patterns of said shutters being correlated in their respective aperture distributions to provide that each first and second position permutation of said shutters selects a corresponding one optical path to pass light through the shutters by virtue of the permutation producing, shutter-by-shutter, and only for the selected path, a simultaneous alignment with the path of all the apertures which correspond thereto, a font plate disposed parallel to said plane to be intersected by said light paths and bearing against an optically contrasting background a plurality of characters which are respectively disposed in said light paths, an optical system adapted to project in succession to a common focal point the images of ones of said characters whose corresponding light paths have been rendered light transmissive by selected position permutations of said shutters, a photosensitive medium disposed at said common focal point to photographically record said successively projected character images, and drive means to set up one after another of said selected position permutations of said shutters.

2. In a photocomposer the combination comprising, a plurality of shutters parallel to a common plane and disposed seriatim in a direction normal to said plane, all said shutters being movable between reference and operated positions by translatory movements which are parallel to said plane, means defining a plurality of optical paths which pass through and normal to said shutters and plane and which are mutually spaced in said plane to form therein a pattern wherein said paths are distributed seriatim both along and transversely to the line of movement of said shutters, and wherein individual paths are each offset along said line of movement from each immediately adjacent path which is transversely spaced from the path said to be offset, each of said shutters having formed therein a different pattern of optical apertures respectively corresponding to said paths and distributed over the shutter to provide that some of said apertures are aligned with said of said paths when the shutter is in said reference position and the rest of said apertures are displaced from their corresponding light paths when the shutter is in reference position by a displacement equal in amount and direction to the displacement undergone by the shutter in moving from reference to operated position, the rest of said apertures being thereby aligned with the rest of said paths when the shutter is in said operated position, the aperture patterns of said shutters being correlated in their respective aperture distributions to provide that each first and second position permutation of said shutters selects a corresponding one optical path to pass light through the shutters by virtue of the permutation producing, shutter-by-shutter, and only for the selected path, a simultaneous alignment with the path of all the apertures which correspond thereto, a font plate disposed parallel to said plane to be intersected by said light paths and bearing against an optically contrasting background a plurality of characters which are respectively disposed in said light paths, an optical system adapted to project in succession to a common focal point the images of ones of said characters whose corresponding light paths have been rendered light transmissive by selected position permutations of said shutters, a photosensitive medium disposed at said common focal point to photographically record said successively projected character images, and drive means to set up one after another of said selected position permutations of said shutters.

3. In a photocomposer the combination comprising, a plurality of shutters parallel to a common plane and disposed seriatim in a direction normal to said plane, all said shutters being movable between reference and operated positions by translatory displacements which are parallel to said plane and which each have a value y; means defining a plurality of optical paths which pass through and normal to said shutters and plane and which are mutually spaced in said plane to form therein a pattern wherein said paths are distributed seriatim both along and transversely to the line of displacement of said shutters, and wherein individual paths are each offset along said line of displacement from each immediately adjacent path which is transversely spaced from the path said to be offset to provide a center-to-center separation of less than $2y$ for adjacent ones of said paths, each of said shutters having formed therein a different pattern of optical apertures respectively corresponding to said paths and distributed over the shutter to provide that some of said apertures are aligned with some of said paths when the shutter is in said reference position and the rest of said apertures are displaced from their corresponding light paths when the shutter is in reference position by a displacement equal in amount and direction to the displacement undergone by the shutter in moving from reference to operated position, the rest of said apertures being thereby aligned with the rest of said paths when the shutter is in said operated position, the aperture patterns of said shutters being correlated in their respective aperture distributions to provide that each first and second position permutation of said shutters selects a corresponding one optical path to pass light through the shutters by virtue of the permutation producing, shutter-by-shutter, and only for the selected path, a simultaneous alignment with the path of all the apertures which correspond thereto, a font plate disposed parallel to said plane to be intersected by said light paths and bearing against an optically contrasting background a plurality of characters which are respectively disposed in said light paths, an optical system adapted to project in succession to a common focal point the images of ones of said characters whose corresponding light paths have been rendered light transmissive by selected position permutations of said shutters, a photosensitive medium disposed at said common focal point to photographically record said successively projected character images, and drive means to set up one after another of said selected position permutations of said shutters.

4. In a photocomposer the combination comprising a plurality of shutters parallel to a common plane and disposed seriatim in a direction normal to said plane, all said shutters being movable between reference and operated positions by translatory displacements which are parallel to said plane and which each have a value $y$; means defining a plurality of optical paths which pass through and normal to said shutters and plane and which are mutually spaced in said plane to form therein a pattern wherein the centers of said paths correspond to the intersection points of a mesh of equilateral triangles having sides of length less than $2y$, each of said shutters having formed therein a different pattern of circular optical apertures of diameters less than $y$ which apertures respectively correspond to said paths and are distributed over the shutter to provide that some of said apertures are aligned with some of said paths when the shutter is in said reference position and the rest of said apertures are displaced from their corresponding light paths when the shutter is in reference position by a displacement equal in amount and direction to the displacement undergone by the shutter in moving from reference to operated position, the rest of said apertures being thereby aligned with the rest of said paths when the shutter is in said operated position, the aperture patterns of said shutters being correlated in their respective aperture distributions to provide that each first and second position permutation of said shutters selects a corresponding one optical path to pass light through the shutters by virtue of the permutation producing, shutter-by-shutter, and only for the selected path, a simultaneous alignment with the path of all the apertures which correspond thereto, a font plate disposed parallel to said plane to be intersected by said light paths and bearing against an optically contrasting background a plurality of characters which are respectively disposed in said light paths, an optical system adapted to project in succession to a common focal point the images of ones of said characters whose corresponding light paths have been rendered light transmissive by selected position permutations of said shutters, a photosensitive medium disposed at said common focal point to photographically record said successively projected character images, and drive means to set up one after another of said selected position permutations of said shutters.

5. In a photocomposer, the combination as in claim 4 wherein the sides of said equilateral triangles are substantially of the length $y\sqrt{3}$ and wherein the diameters of said apertures are less than but approach the value $y$.

6. In a photocomposer the combination comprising, a plurality of shutters parallel to a common plane and disposed seriatim in a direction normal to said plane, all said shutters being movable between reference and operated positions by translatory movements which are parallel to said plane, means defining a plurality of optical paths which pass through and normal to said shutters and plane and which are mutually spaced in said plane to form therein a pattern wherein the centers of said paths correspond to the intersection points of a mesh of equilateral triangles extending over said plane, each of said shutters having formed therein a different pattern of optical apertures respectively corresponding to said paths and distributed over the shutter to provide that some of said apertures are aligned with some of said paths when the shutter is in said reference position and the rest of said apertures are displaced from their corresponding light paths when the shutter is in reference position by a displacement equal in amount and direction to the displacement undergone by the shutter in moving from reference to operated position, the rest of said apertures being thereby aligned with the rest of said paths when the shutter is in said operated position, the aperture patterns of said shutters being correlated in their respective aperture distributions to provide that each first and second position permutation of said shutters selects a corresponding one optical path to pass light through the shutters by virtue of the permutation producing, shutter-by-shutter, and only for the selected path, a simultaneous alignment with the path of all the apertures which correspond thereto, a font plate disposed parallel to said plane to be intersected by said light paths and bearing against an optically contrasting background a plurality of characters which are respectively disposed in said light paths, an optical system adapted to project in succession to a common focal point the images of ones of said characters whose corresponding light paths have been rendered light transmissive by selected position permutations of said shutters, a photosensitive medium disposed at said common focal point to photographically record said successively projected character images, and drive means to set up one after another of said selected position permutations of said shutters.

7. In a photocomposer, the combination as in claim 6 wherein the plurality of apertures in each shutter defines for the shutter an aperture pattern of circular outline.

References Cited in the file of this patent

UNITED STATES PATENTS

| | | |
|---|---|---|
| 287,858 | Perry | Nov. 6, 1883 |
| 1,935,471 | Kanolt | Nov. 14, 1933 |
| 2,169,838 | Herbst | Aug. 15, 1939 |
| 2,351,126 | Highton | June 13, 1944 |
| 2,370,615 | Bryce | Mar. 6, 1945 |
| 2,388,961 | Elliott | Nov. 13, 1945 |
| 2,392,224 | Bryce | Jan. 1, 1946 |
| 2,600,168 | Klyce | June 10, 1952 |
| 2,663,232 | Drillick | Dec. 22, 1953 |
| 2,682,814 | Higonnet | July 6, 1954 |

UNITED STATES PATENT OFFICE

CERTIFICATE OF CORRECTION

Patent No. 2,803,178                                      August 20, 1957

Robert W. Lotz

It is hereby certified that error appears in the printed specification of the above numbered patent requiring correction and that the said Letters Patent should read as corrected below.

Column 3, line 45, for "preferred" read -- referred --; line 52, for "ot" read -- to --; line 54, for "receiev" read -- receive --; column 4, line 10, for "plurality" read -- pluralities --; line 54, for "shuter" read -- shutter --; column 7, line 6, for "ot" read -- to --; column 8, line 34, for "with with" read -- with --; column 10, line 34, for "interpsaces" read -- interspaces --; line 35, for "and a light" read -- and light --; column 12, line 57, for "The optical path" read -- The optical paths --; column 14, line 57, for "patterns" read -- pattern --; column 15, line 34, for "said of said" read -- some of said --.

Signed and sealed this 15th day of October 1957.

(SEAL)

Attest:
KARL H. AXLINE                                             ROBERT C. WATSON
                                                                    Commissioner of Patents
Attesting Officer